Figure 1:
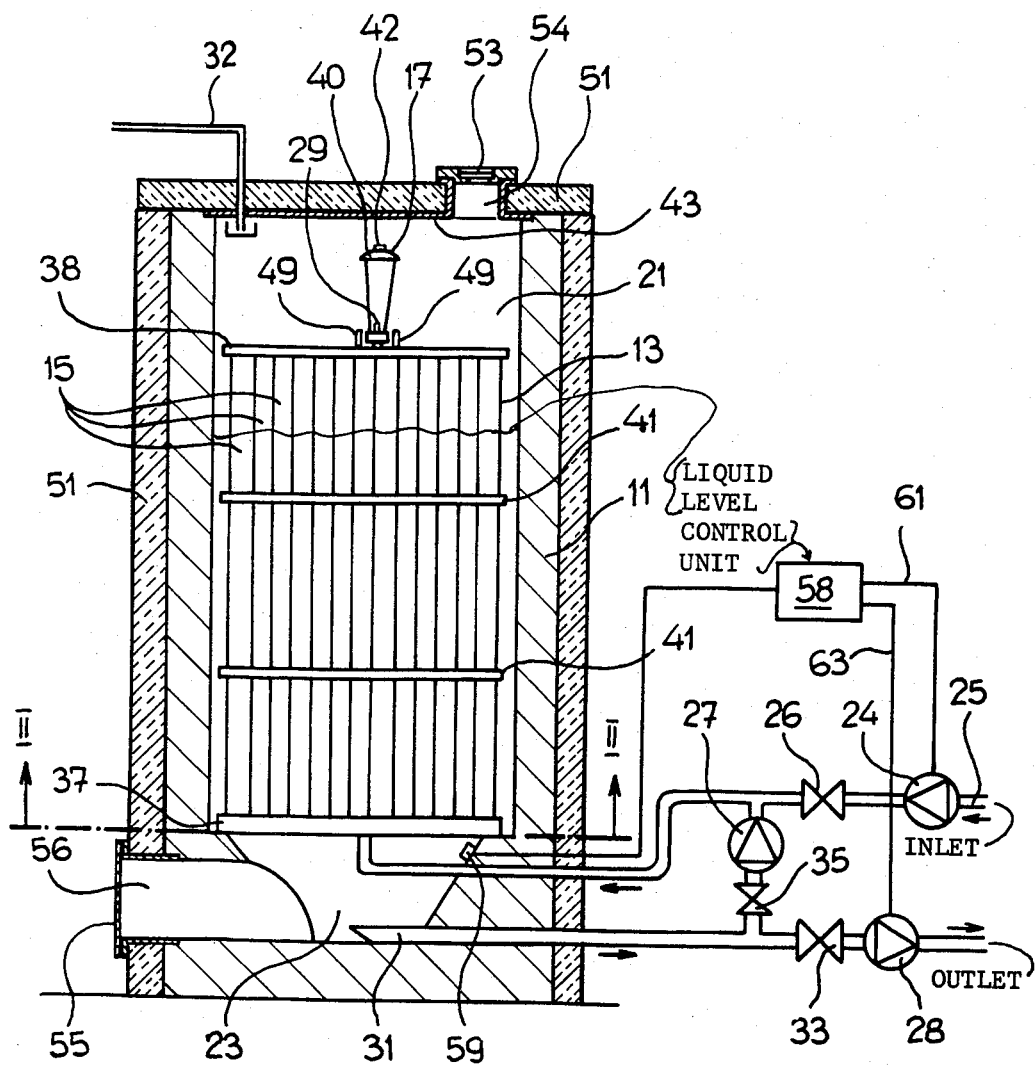

United States Patent [19]

Goerlich

[11] Patent Number: 4,488,960
[45] Date of Patent: Dec. 18, 1984

[54] BIOLOGICAL REACTOR APPARATUS FOR BIOLOGICAL DECOMPOSITION OF ORGANIC REFUSE

[75] Inventor: Lothar Goerlich, Dissen, Fed. Rep. of Germany

[73] Assignee: UTB Umwelttechnik Buchs AG, Buchs, Switzerland

[21] Appl. No.: 519,693

[22] Filed: Aug. 2, 1983

[30] Foreign Application Priority Data

Aug. 6, 1982 [CH] Switzerland ............ 4744/82

[51] Int. Cl.³ ............................................. C02C 1/04
[52] U.S. Cl. ....................................... 210/97; 210/151
[58] Field of Search .............. 210/97, 104, 150, 151, 210/519, 520

[56] References Cited

U.S. PATENT DOCUMENTS

| | | | |
|---|---|---|---|
| 1,674,480 | 9/1927 | Nelson | 239/506 |
| 2,188,162 | 2/1938 | Schulhoff | 210/151 |
| 3,189,283 | 1/1963 | Moore | 239/383 |
| 3,849,310 | 11/1974 | Condolios | 210/520 X |
| 3,966,604 | 6/1976 | Diggs | 210/151 X |
| 4,022,689 | 5/1977 | Kato et al. | 210/151 |
| 4,028,246 | 6/1977 | Lund et al. | 210/151 |
| 4,045,344 | 8/1977 | Yokota | 210/151 X |
| 4,192,746 | 3/1980 | Arvanitakis | 210/97 X |
| 4,246,114 | 1/1981 | Krebs et al. | 210/151 |

FOREIGN PATENT DOCUMENTS

2420745 10/1976 Fed. Rep. of Germany.
2068929  9/1981 United Kingdom ............ 210/151

Primary Examiner—John Adee
Attorney, Agent, or Firm—Frishauf, Holtz & Goodman, Woodward

[57] ABSTRACT

The biological reactor contains in a vessel (11) a bundle (13) of tubes (15). The bundle (13) is formed by a plurality of plastic tubes (15) being of preferably square cross-section. The walls of the plastic tubes serve as growth surfaces for microorganisms. A distributing device (17) feeds the different ducts (18) evenly with liquid organic refuse. The ducts (18) are not completely filled. The liquid level in the reactor is at a certain distance from the top of the tubes (15). Accordingly, if one of the ducts (18) tends to clog, it is filled more than the remaining ducts so that in the clogging duct a hydrostatic pressure is created having the tendency to free the duct. This freeing of the duct is assisted by the control unit 58 which from time to time lowers the liquid level in the reactor and then increases it again.

20 Claims, 3 Drawing Figures

BIOLOGICAL REACTOR APPARATUS FOR BIOLOGICAL DECOMPOSITION OF ORGANIC REFUSE

The present invention relates to a biological reactor apparatus for biological decomposition of organic refuse, and more particularly sewage sludge, liquids with high organic waste contents, and the like.

BACKGROUND

The U.S. Pat. No. 2,188,162, Schulhoff, describes a sewage treatment system for biological clarification and purification of sewage by the action of aerobic bacteria. The system includes submerged bundles of tubes on which colonies of aerobic bacterias are formed which are active in decomposition of organic matter contained in sewage. The system includes means for discharging compressed air in finely divided condition into the sewage near the bottom of the tank to furnish the oxigen required by the aerobic bacterias. The patent does not disclose the use of the system for anaerobic decomposition and does not provide means for preventing the clogging of individual tubes.

The German published patent application 24 20 745, to which U.S. Pat. No. 4,045,344, YOKOTA, corresponds, discloses a sewage treatment system with a submerged bundle of tubes or ducts, but provides over the length of a duct a plurality of interconnections with other ducts with the purpose to cause turbulent flow in the ducts. Nozzles are provided to feed air into the sewage to provide for aerobic digestions. It does not disclose anaerobic digestion and means for declogging the ducts.

The published U.K.-patent application No. 2 069 929, Witt, discloses an anaerobic reactor apparatus comprising a sealed vessel containing a packed section filled with a support packing on the surface of which packing is a biomass of microorganisms capable of biologically degrading the organic contents of the liquid waste water. A pump is provided to pump the liquid underneath the packed section, so that the liquid level is always beneath the packed section. The packed section consists of plastic rings or old aluminium cans through which the liquid may trickle. The published application does not disclose the use of the reactor for the treatment of sludge, nor does it show means to prevent clogging, which is a problem when treating sludge.

THE INVENTION

It is an objection to provide an improved biological reactor apparatus for biological decomposition of organic refuse, particularly sewage sludge, liquids with high organic waste contents, and the like, having a high operating reliability and permitting the treatment of such organic refuse within a relatively short time. In particular, clogging of the reactor should be prevented, and if clogging occurs, it should remain limited to small parts of the reactor.

Briefly, the reactor comprises a vessel in which filter means are provided comprising a plurality of essentially vertical or inclinded ducts having walls capable of being covered by microorganism. To provide all ducts evenly with organic refuse to be treated, distributing means are provided above the upper ends of the ducts. Control means capable of controlling the fluid flowing to and from the vessel maintain a liquid level in the vessel below the upper ends of the ducts. In this way clearly defined fluid flows through the ducts are obtained which prevent a reduction of cross section or a clogging of the ducts. However, the walls of the individual ducts provide large surfaces for the growth of microorganisms so that a fast decomposition of the substances contained in the sludge or other liquid takes place. During operation the single ducts can easily be supervised so that in case of a clogging of a duct the necessary measures for declogging can be undertaken. An important advantage of the reactor is that the reduction of cross section in one duct does not have detrimental effects on the remaining part of the reactor. Accordingly there is no danger of flow obstructions as on conventional reactors containing plastic rings or other filling material. Because control means are provided controlling the liquid level of the reactor in such a way that the ducts are not filled to the top, clogging of a duct will cause a higher filling of the duct so that a hydrostatic pressure is created having the tendency to free the duct. If this freeing does not take place automatically in the use of the reactor, the hydrostatic pressure in the clogged duct can further be increased by lowering the level in the reactor by pumping. For this purpose the means for maintaining a certain liquid level can be controlled by a control device capable of keeping the liquid level constant or changing the liquid level. If the liquid level is lowered the hydrostatic pressure in the clogged canal is further increased so that this canal is freed in most cases. If the distributing means are in operation at a low liquid level a rinsing operation takes place during which the walls of the canals are washed. Clogging can be prevented also this way. It has been found that in operation, even without intermittent lowering the liquid level, there is hardly any danger of clogging if the cross sections of the ducts are properly dimensioned and if the filling level of the filter is correctly selected.

In accordance with a feature of the invention the ducts are formed by tubes. The tubes have preferably a polygonal cross section. Of advantage is a square or rectangular cross section, because tubes with such cross sections are commercially available at low prices. For reasons of low material consumption hexagonal tubes may be selected. When square, rectangular, or hexagonal tubes are used there will be no unused spaces between the tubes. The tubes are preferably made of plastics. A relatively cheap plastic material may be used, because the tubes are not subjected to high mechanical stresses.

In accordance with a feature of the invention the tubes are tied to a bundle by rings formed by a L-profile located at the upper and the lower end, respectively, of the tubes. The bundle may further be held together at intermediate locations by belts. The bundle may further comprise at the lower end of the tubes radial reinforcing members connected to a ring used for tying the bundle.

The distribution means are of particular importance for the good functioning of the biological reactor. Accordingly, a further feature of the invention provides that the distributing means comprise nozzle means at the end of the inlet means and deflector means located at a distance from the nozzle means for evenly distributing organic refuse over the upper ends of the ducts. An equal distribution over the ducts is of importance so that in all ducts are practically the same velocities of flow. This velocity should not be too high so as not to disturb the microorganisms growing on the walls of the duct. Further, in accordance with a feature of the invention, the deflector means comprises an opening permitting part of the fluid issuing from the nozzle means to flow through said opening and to hit the top of the vessel or a further deflector. This fluid is mainly falling back to the ducts in the center of the bundle of tubes.

In accordance with a feature of the invention adjusting means are provided to adjust the distance between the nozzle means and the deflector means. This permits to adjust the deflector means to provide the desired distribution of the fluid.

In accordance with a further feature of the invention the distributing means include lateral bars connecting the nozzle means with the periphery of the deflector means. This has the advantage that fiber material attaching to the rods is gliding down when the fluid stream is shut-off. On renewed switching-on of the fluid stream the fiber material is removed.

In accordance with the invention the control means may provide that in predetermined intervals the liquid level in the reactor is lowered and then again increased. In this way a clogging is prevented.

The biological reactor is particularly suitable for anaerobic decomposition of organic refuse, because in operation no high shearing forces are occuring which could be detrimental to the biochemical reactions. The reactor is of particular interest because of the small dimensions required. This makes it possible to locate the reactor inside an existing vessel used for treating sludge.

DRAWINGS

Figure 2:
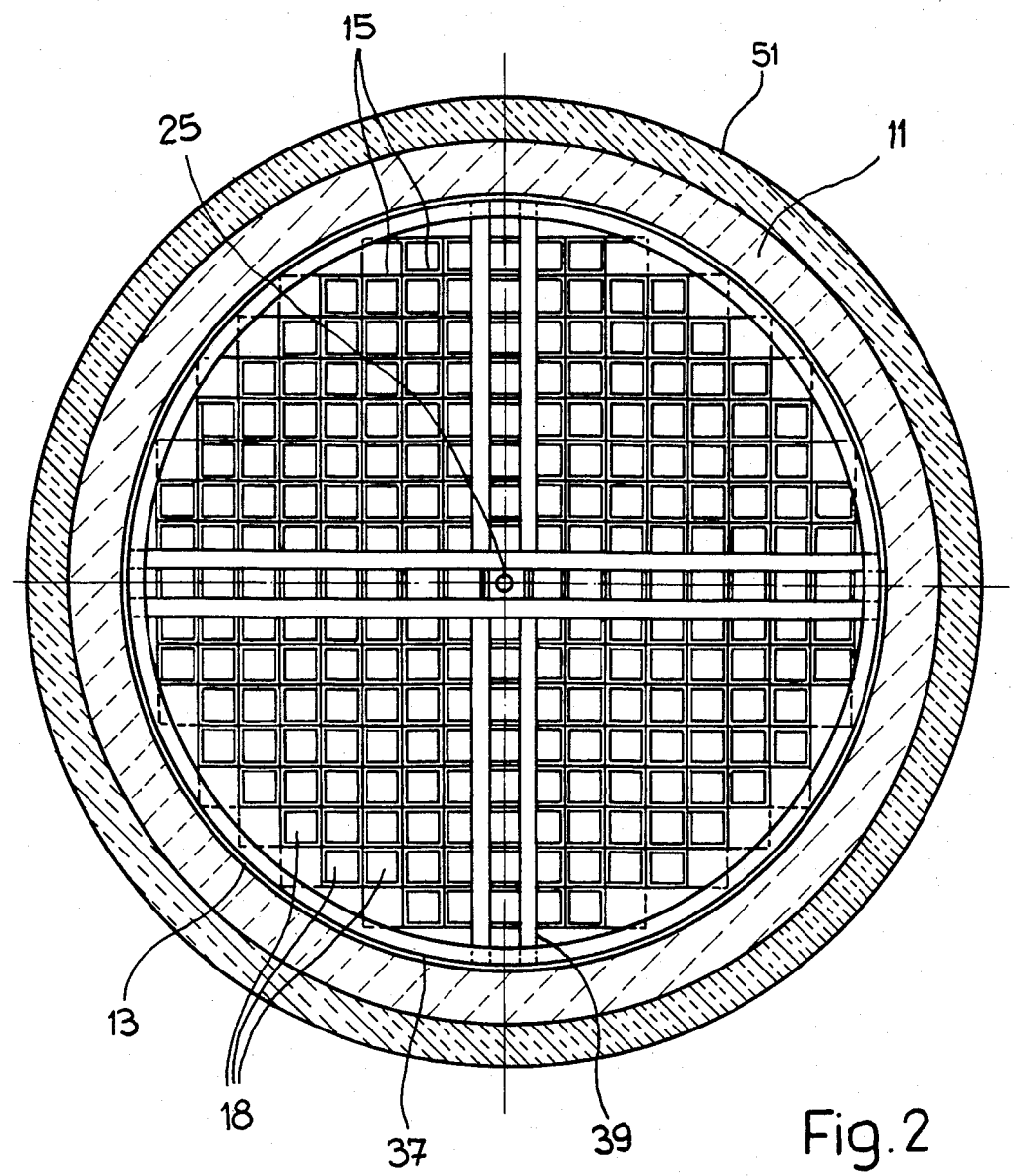
Figure 3:
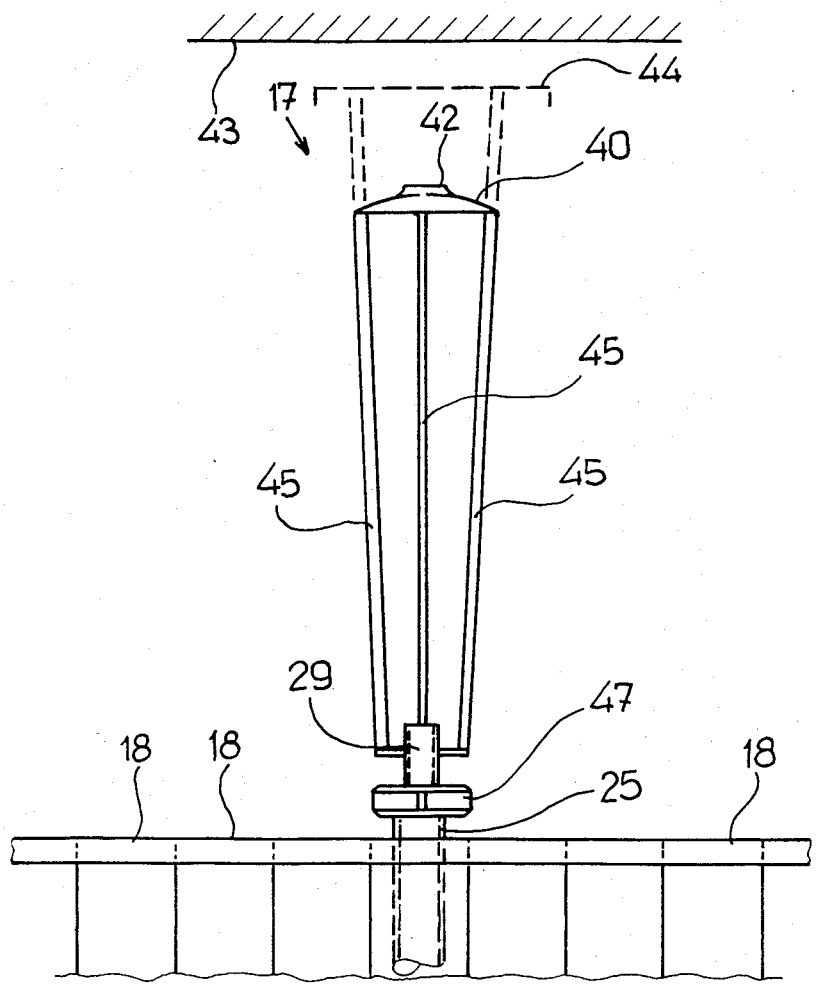

FIG. 1 is a schematic diagram of a biological reactor,
FIG. 2 is a crossection through the reactor of FIG. 1 along the lines II—II,
FIG. 3 is an elevation of the distributing device.

The biological reactor shown in FIGS. 1 to 3 is particularly suited for anaerobic treatment of organic refuse, particularly sewage sludge and liquids with high organic waste contents. The vessel 11 is provided with a bundle 13 of tubes 15. The tubes 15 are fed by a distributor 17 with sewage sludge or other liquid organic refuse. The tubes 15 form a plurality of ducts or canals 18, as seen in FIG. 2. The ducts 18 have a predetermined crossection and the walls of these ducts 18 serve as growth surfaces for microorganisms. On the preferred embodiment of the invention shown the tubes 15 and the ducts or canals 18 formed thereby are essentially vertically. They could also be inclined as long as there is sufficient inclination for a fluid flow. Optimal flow of the fluid is obtained with vertical ducts. The upper ends of the ducts 18 are located in the upper space 21 of the vessel 18, and the lower ends of the ducts 18 are located at the lower space 23 of the vessel 11. The feed line 25 for the sewage sludge and the like leads over the metering pump 24 and the valve 26 to the nozzle 29 (FIG. 3) of the distributor 17. The discharge line 31 leads from the lower space 23 over the valve 33, the discharge pump 28, which is also preferably a metering pump, to a further part of the organic refuse treatment plant of which the biological reactor is a part. To provide circulation of the contents of the reactor the valve 35 connects the line 31 over a circulation pump to the feed line 25. Accordingly, after closing of the valves 26 and 33 the contents of the biological filter or reactor can be circulated with the circulation pump 27. The gas generated by the biochemical reaction is discharged through the gas outlet 32 (FIG. 1) and can be used for heating or energy supply purposes. Considering the bundle 13 of tubes 15 according to the FIGS. 1 and 2 it becomes evident that in the embodiment shown the tubes 15 have a square crossection. The tubes are preferably plastic tubes having a crossectional area of more than 30 cm$^2$. The crossection should be chosen in relationship to the size of solid objects contained in the organic refuse to be treated. For the treatment of sewage sludge a crossectional area of 64 cm$^2$ has been found suitable. Instead of square or rectangular tubes also round or polygonic tubes may be used. However, square tubes are available at relatively low prices. Hexagonal tubes would be of advantage from the point of material requirements, but provide somewhat less growth surfaces than square or rectangular tubes. The tubes preferably consist of PVC or Polyester and may contain a high content of old material or a filler, because they are not subjected to high hydraulic or mechanical loads. This permits a cheap and relatively light construction and causes no corrosion problems. On large reactors the bundle of tubes may consist of different parts. The bundle 13 of tubes has a ring 38, 37 formed by a L-profile at the upper end and at the lower end. At the lower end of the tubes radial reinforcing members of T-profile form a reinforcing cross 39 (FIG. 2). The bundle 13 is further held together by belts 41 located at a distance from the upper and lower end. The rings 37, 38, the reinforcing cross 39 and the belts 41 are made of corrosion-proof steel or steel with a corrosion-proof cover. The bundle 13 of tubes 15 has the form corresponding to the compartment 11. For large installations there are preferably modules of tube bundles, each module having a size permitting easy transportation and mounting.

The distributor 17 for the liquid to be processed has a nozzle 29 located at the end of the feed line 25. At a distance from the nozzle 29, which distance is preferably adjustable, a deflector 40 is provided. The deflector 40 has the purpose to distribute the jet issuing from the nozzle 29 equally over the upper openings of the canals 18. The deflector 40 has a central opening 45 located at a predetermined distance from the top 43 of the vessel 11. However, it is also possible to provide above the deflector 40 a further deflector 42 as indicated with dotted lines. In this case the distance of the top 43 from the nozzle 29 is not critical. In operation a part of the jet issuing from the nozzle 29 is deflected by the deflector 40, whereas another part of the jet is passing through the opening 42 and hitting the top 43 or, if there is any, the deflector 44. From there the liquid is particularly falling back to the central region of the bundle 13 of tubes. As FIG. 3 shows, the deflector 40 and the second deflector 44, if any, is held by the rod 45 diverging from the nozzle 29 to the periphery of the deflector 40. This arrangement proved to be very safe in operation, because fiber material may glide back to the nozzle 29 if no jet is issuing therefrom. As soon as a jet is again issuing from the nozzle 29 the fiber material is ejected. The distributor 17 consisting of deflector 40 and eventually deflector 44 and nozzle 29 is releasibly connected with a screw coupling 47 at the feed line 25. Different forms of nozzles 29 are possible. Adjusting means, e.g. a screw, may be provided to change the distance between the nozzle 29 and the deflector 40 and to provide for adjustment during mounting or in later operation.

As FIG. 1 shows, suspension lugs 49 are provided which permit to lower the bundle 13 of tubes with a hoist into the completed container 11, or to remove the bundle 13 of tubes from the container 11 for maintainance purposes. Thermal insulation 51 is provided on the container 11. An inspection glass 53 is covering the inspection opening 54. A further opening 56 is located at the lower part of the container 11 and is normally closed by a cover 55. A control unit 58 is provided which is connected to a sensor 59, e.g. a manometer, and has the purpose to maintain the liquid level in the vessel 11 at a level below the upper ends of the ducts 18. For this purpose control lines 61, 63 lead to the metering pump 24 and the discharge pump 28, which may also be a metering pump. If both pumps 24, 28 have the same feed rate and operate at the same time the liquid level in the reactor remains basically constant. After an undesired change of the liquid level the control unit 58 may switch a pump 24, 28 on or off. The control unit 58 can also serve to prevent clogging by changing the liquid level in the vessel 11 at predetermined intervals.

I claim:

1. A biological reactor apparatus for biological decomposition of organic refuse, particularly sewage sludge, liquids with high organic waste contents, and the like, comprising
    a closed vessel (11) for anaerobic bacterial decomposition of the refuse;
    a plurality of essentially vertical ducts (18) having upper and lower open ends and having walls capable of being covered by microorganisms located in said vessel;
    inlet means (25, 24, 26) for the organic refuse;
    distributing means (17) capable of evenly distributing organic refuse over the upper ends of said ducts (18) and connected to said inlet means (17);
    outlet means (31, 33, 28) connected with said vessel (11) and communicating with the lower open ends of the ducts (18) to remove organic refuse after its treatment in said vessel (11), and
    control means (58) connected to and controlling flow of refuse through at least one of the inlet and outlet means (25, 24, 26; 31, 33, 28) to maintain a liquid level in said vessel (11) intermediate the upper and lower ends of said ducts (18).

2. Reactor according to claim 1, wherein said control means (58) is capable of changing the liquid level in said vessel (11) at predetermined intervals or on command to prevent clogging of the ducts (18).

3. Reactor according to claim 1, further including a sensor (59) in said vessel (11) to sense the liquid level or the liquid pressure in said vessel (11).

4. Reactor according to claim 1, wherein the inlet means and the outlet means comprise a metering pump (24, 28).

5. Reactor according to claim 4, wherein both metering pumps have the same feed rate.

6. Reactor according to claim 1, wherein said ducts (18) are formed by tubes (15).

7. Reactor according to claim 1, wherein said ducts (18) are formed by tubes (15) of square or rectangular cross-section.

8. Reactor according to claim 1, wherein said ducts (18) are formed by tubes (15) of hexagonal crossection.

9. Reactor according to claim 1, wherein said ducts (18) are tubes of plastic.

10. Reactor according to claim 1, wherein said ducts are tubes (18);
    rings (38, 37) of an L-profile located at the upper and the lower end, respectively, of the tubes (18), and
    belts (41) at intermediate locations for tying the tubes into a bundle (13).

11. Reactor according to claim 10, further comprising, at the lower end of the tubes (15), radial reinforcing members (39) connected to the ring (37) at the lower ends of the tubes.

12. Reactor according to claim 1, wherein said distributing means (17) comprise
    nozzle means (29) at the end of said inlet means (25, 24, 26), and
    deflector means (40) located at a distance from said nozzle means (29) for evenly distributing organic refuse over the upper ends of said ducts (18).

13. Reactor according to claim 12, wherein said deflector means comprise an opening (42) permitting part of the fluid issuing from said nozzle means (29) to flow through said opening (42) and to hit the top (43) of said vessel (11).

14. Reactor according to claim 12, wherein said distributing means comprises deflector means (40) having a central opening (42) permitting part of the fluid issuing from said nozzle means (29) to flow through said opening (42), and includes further deflector means (44) at a predetermined distance from said nozzle means (29).

15. Reactor according to claim 12, including adjusting means (47) to adjust the distance between said nozzle means (29) and said deflector means (40).

16. Reactor according to claim 12, including lateral bars (45) connecting said nozzle means (29) with the periphery of said deflector means (40).

17. A biological reactor apparatus for anaerobic decomposition of organic refuse, particularly sewage sludge, liquids with high organic waste contents, and the like, comprising
    a closed vessel (11) for anaerobic microorganism decomposition of the refuse;
    a bundle (13) of tubes (15) providing a plurality of essentially vertical ducts (18) having upper and lower open ends and walls capable of being covered by microorganisms,
    inlet means (25, 24, 26) for the organic refuse, said inlet means including a metering pump (25),
    distributing means (17) capable of evenly distributing organic refuse over the upper ends of said tubes (18), said distributing means comprising nozzle means (29) connected to said inlet means (25) and deflector means (40) located at a distance from said nozzle means (29) and distributing the refuse to the upper open ends of the tubes,
    outlet means (31, 33, 28) connected to said vessel (11) to remove organic refuse after treatment in said vessel (11), said outlet means including a metering pump (28), and
    control means (58) connected to and controlling at least one of said pumps to maintain a liquid level in said vessel (11) intermediate the upper and lower ends of said tubes.

18. Reactor according to claim 17, wherein both pumps have the same feed rate.

19. Reactor according to claim 17, wherein said control means comprise a sensor (59) in said vessel (11) to sense the liquid level or the liquid pressure in said vessel (11).

20. Reactor according to claim 17, wherein a circulation pump (27) is provided for circulating the liquid in the vessel.

* * * * *